Oct. 6, 1959 F. P. RODWICK ET AL 2,907,269
TOASTER
Filed March 9, 1955 6 Sheets-Sheet 1

INVENTORS
Frank P. Rodwick
Nicholas T. Thorne
By: Olson & Trexler attys.

United States Patent Office 2,907,269
Patented Oct. 6, 1959

2,907,269
TOASTER

Frank P. Rodwick, Chicago, and Nicholas T. Thome, Worth, Ill., assignors to The Silex Company, Hartford, Conn., a corporation of Connecticut Application March 9, 1955, Serial No. 493,198

4 Claims. (Cl. 99—391)

This invention is concerned generally with an electric toaster, specifically one for toasting bread and the like in horizontal position.

It often is desirable to toast bread in horizontal position, so that open-faced sandwiches of various types can be made, and so that butter and a spread such as cinnamon and sugar can be placed on the bread before toasting, so that the flavor will be enhanced and will be spread into the bread. Previous efforts to produce toasters of this type have not always been entirely successful. Some such toasters have poor heat distribution, thereby causing the centers of the bread to be underdone, or causing the edges thereof to be scorched or burned. Most such prior toasters have required horizontal actuation of an operating member to slide the bread into toasting position. This has caused a dangerous tendency to push the toaster off of a supporting table or the like.

Accordingly, it is an object of this invention to provide an improved toaster for toasting bread in horizontal position wherein the heat distribution is uniform, thereby avoiding variations in degree of toasting throughout a slice of bread.

Yet another object of this invention is to provide a toaster for toasting bread in horizontal position wherein the toast carrying mechanism is operated by vertical shifting of a handle through the intermediary of a superior shifting structure.

It is another object of this invention to provide an improved handle for a toaster requiring no close manufacturing tolerances, providing greater stability, and providing a better appearance.

It is another object of this invention to provide an actuating mechanism of very low friction for moving bread horzontally into a toaster in response to vertical movement of an operating member.

Still another object of this invention is to provide an improved thermostatic mechanism for a toaster, particularly a toaster of the character heretofore set forth.

Other objects and advantages of the present invention will be apparent from the following description when taken in connection with the accompanying drawings, wherein.

Figure 1:
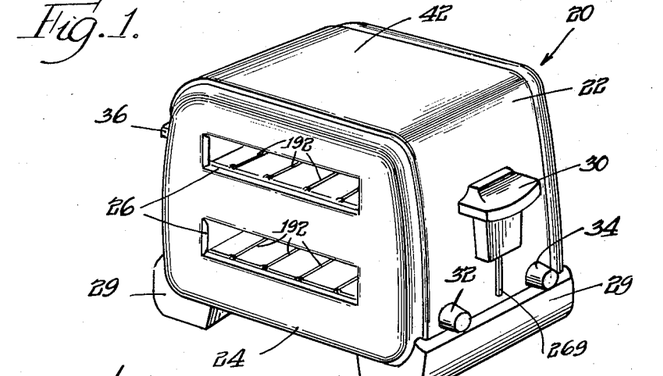
Fig. 1 is a perspective view of a toaster constructed in accordance with the principles of my invention.
Figure 3:
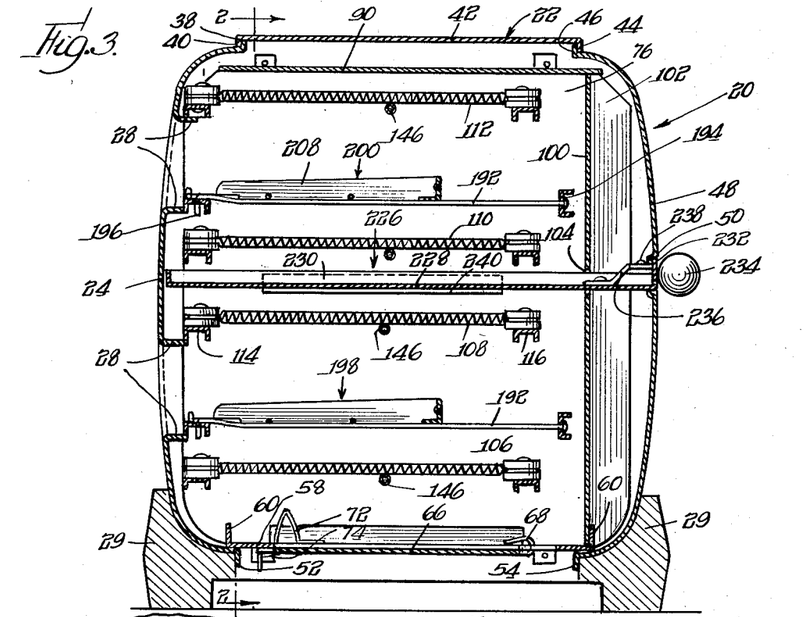
Fig. 3 is a vertical cross sectional view of the toaster, as taken along the line 3—3 in Fig. 2.

Referring now in greater particularity, and first to Fig. 1 for a general understanding of the toaster, there will be seen to be a toaster generally designated by the numeral 20 and having a sheet metal case 22 having a front face 24 in which there is provided a pair of horizontal openings 26, the sheet metal of the face 24 being turned in slightly at the openings 26 as may be seen at 28 in Fig. 3. The toaster is provided at its opposite ends with feet 29 of molded plastic or other suitable heat-insulating material so that the toaster may rest upon a table or the like. The toaster further is provided with an operating handle 30 disposed on one end of the case, and with a pair of control knobs 32 and 34, the purposes of which will be disclosed later. A fixed handle 36 generally similar in external appearance to the handle 30 is provided on the end of the toaster opposite to the handle 30.

Figure 5:
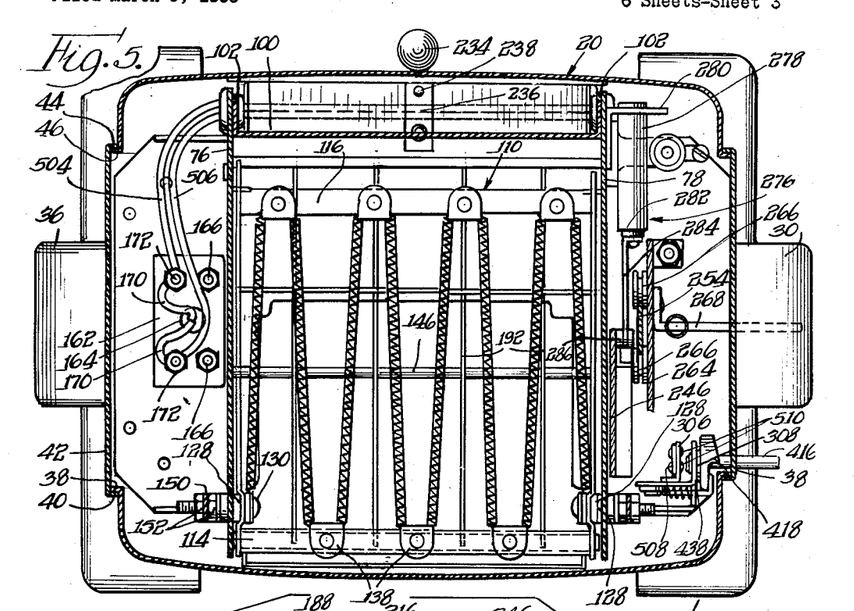
Fig. 5 is a horizontal sectional view taken substantially along the line 5—5 in Fig. 2.

The front force or portion 24 of the toaster case 22 is provided with small, outwardly directed flanges 38 (Fig. 3) extending along the top edge thereof, and also along the side edges thereof (Fig. 5). These flanges are trapped by an inturned flange 40 extending along the edge of the central portion 42 of the toaster case or housing. A similar flange 44 is provided along the rear edge of the central housing portion 42 and this traps the top and edge flanges 46 of a back panel 48 for the toaster. The back panel is provided with an intermediate slot 50, the purpose of which will be described hereinafter. Similar bottom flanges 52 and 54 on the front and back panels serve to rigidify the bottom edges of the panels, and also lock within the feet 29. The edge and bottom flanges of both the front and back panels are continuous, but the upper flanges 38 and 46 are discontinuous to facilitate assembly, and to allow heat to escape at the top of the toaster housing. This discontinuous structure may be seen in Fig. 2, wherein the flange 46 is provided with notches 56 which are substantially equal in length to the flange sections between the notches.

Figure 4:
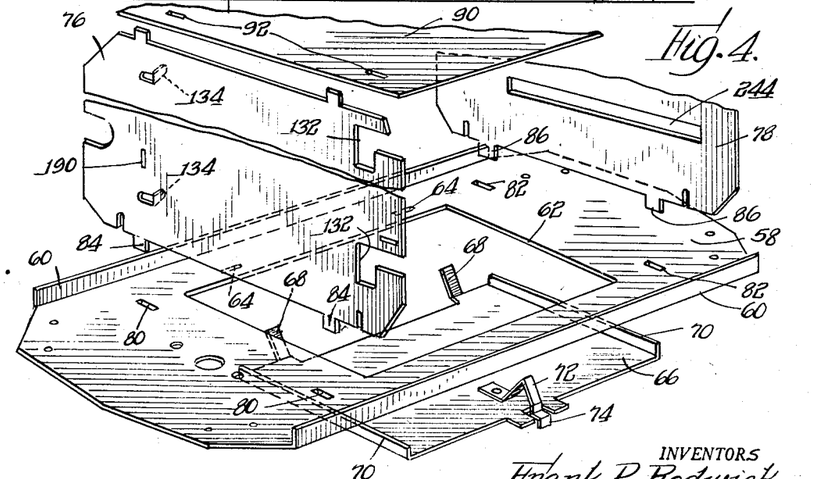
Fig. 4 is an exploded, fragmentary perspective view of certain of the interior parts of the toaster.

Within the toaster housing or case 20 there is provided a frame comprising a base plate 58 having upturned edge flanges 60. This base plate, as may be seen in Figs. 2–4, extends from end to end of the toaster housing, and substantially from side to side thereof. The base plate is provided with a large central aperture 62 which conveniently is of rectangular configuration. A pair of slots 64 is provided in the base plate 58 immediately behind the aperture 62. A closure plate 66 of the same outline as the aperture 62, and slightly smaller than this aperture, is provided with rearwardly extending tabs 68 which project up through the slots 64, and then are curled over, as may be seen in Fig. 3, to hold the closure plate 66 hingedly in the opening 62. The closure plate is provided with shallow upturned end flanges 70 for rigidity, and is provided at its front edge with a spring latch 72 co-operating with the front edge of the opening 62, and having a detent 74 extending below the base plate 58 for manual release of the latch 72. The opening 62 and plate 66 serve to drop crumbs and the like from the toaster, and also serve as an access space for cleaning or repair.

A pair of end plates 76 and 78 upstands from the base plate 58. To this end the base plate is provided with pairs of slots 80 and 82 generally toward the opposite ends of the base plate, and the end plates 76 and 78 respectively are provided with pairs of tabs 84 and 86 which project down through the slots 82. Pins or other fastening members 88 may be passed through the tabs after insertion through the slots as may be seen in Fig. 2, or the tabs may be twisted or otherwise deformed to lock them in place in the slots.

A top plate 90 is provided which extends across the top of the end plats 76 and 78, extending almost from the front to the rear of these plates. The top plate is provided with pairs of slots 92 adjacent the opposite ends thereof, and tabs 94 on the end plate 76, and tabs 96 on the end plate 78 extend up through these slots and are held in place by means such as pins 98 piercing the tabs, or by twisting or other deformation of the tabs. It will be appreciated that this top plate reflects heat from the heating elements shortly to be described down into the toaster, thereby preventing the top of the central housing portion 42 from becoming too hot for safety.

In addition to the foregoing parts of the toaster frame, there is provided a back plate 100, which may be seen in Figs. 3 and 5. This back plate completely fills the space between the base plate and top plate, and between the end plates. The back plate is provided with right angled flanges 102 along its vertical edges. These right angled flanges abut the end plates 76 and 78 respectively, and are held thereto by any suitable means such as sheet metal screws (not shown) passed through the end plates and threaded into the flanges. The back plate 100 is provided with a horizontal slot 104 which is in horizontal alignment with the slot 50 in the back face of the housing or case.

Figure 6:
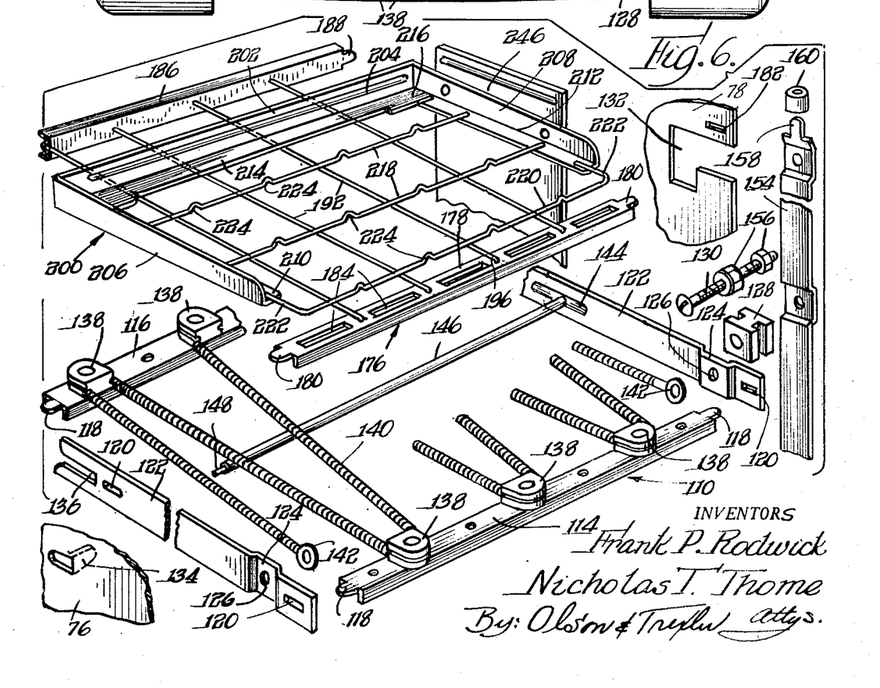
Fig. 6 is a fragmentary, exploded perspective view of certain of the internal parts of the toaster.

The toaster is provided with four horizontally disposed and vertically spaced apart heating units, respectively numbered 106, 108, 110, and 112 from the bottom toward the top of the toaster. The heating units are of identical construction, and the unit 110 will be described by way of example with reference to Figs. 5 and 6. This heating unit comprises front and rear channel members 114 and 116 respectively. These channel members are provided with longitudinally extending tongues 118 at their opposite ends. These tongues project through co-operating slots 120 in side members or bars 122. The tongues preferably are bent down after insertion through the slots in order to hold the parts together. Near the front end of each of the side members 122, there is provided an inwardly offset portion 124 having an aperture 126 therein. An insulator is mounted on each of these offset portions 124 as is indicated at 128 by means of a connector screw 130. The screw is insulated from the end members 122 by any suitable means such as mica washers and bushings. The insulators interfit with L-shaped notches 132 along the front edges of the end plates 76 and 78, as may be seen in Figs. 4 and 6, thus to support the front ends of the heating or toasting units. The rear ends are supported by inwardly struck out tongues 134 on the end plates 76 and 78, which fit into horizontally elongated slots 136 in the side members 122. These slots facilitate sliding of the heating units horizontally into position, the insulators 128 sliding into the L-shaped slots 132 and dropping down into the ends thereof for locking the units in place.

A plurality of insulators 138 is spaced along each of the channels 114, and a helical heating wire or element 140 is zigzagged back and forth among these insulators, and the ends thereof are suitably connected to eyelets 142 which receive the screws 130 for insulatedly supporting the ends of the heating wire from the side members 122. The side members 122 of the heating units 108 and 112 are provided with horizontal offset portions 144, and sleeve insulators 146 on metal rods 148 extend between these portions to support the heating element 140 free from sagging when it expands with heat. It will be appreciated that if the heating elements of the unit 108 and 112 were permitted to sag, they might come into contact with a sandwich or the like being toasted. The heating elements 106 and 110 are positioned beneath the sandwiches or the like being toasted, and sagging of these elements does not introduce any possibility of engagement of these heating elements with the sandwich or the like. Therefore, the insulators 146 and rods 148 may be dispensed with for the units 106 and 110, although it might be less expensive in accordance with mass production practices to manufacture all of the units absolutely identical, thereby providing horizontal supporting insulators to prevent sag in all of the heating elements.

All of the screws 130 on one side of the heating units are passed through aperatures in a vertical busbar 150 and are held thereto by nuts 152 threaded on these screws 130 on opposite sides of the busbar. The screws 130 on the opposite side of the heating units are secured through busbar 154 by means of nuts 156 threaded on the screws 130. The busbars are provided at their upper ends with upwardly extending tongues or fingers 158, and ceramic caps 160 are placed over these fingers or tongues to prevent engagement of the busbars with the top plate 90. It would be well to note at this time that preferably all of the insulators heretofore described, including the insulators 128, 138, 146, and 160 are of heat resisting construction, such as porcelain or other ceramic material.

Figure 2:
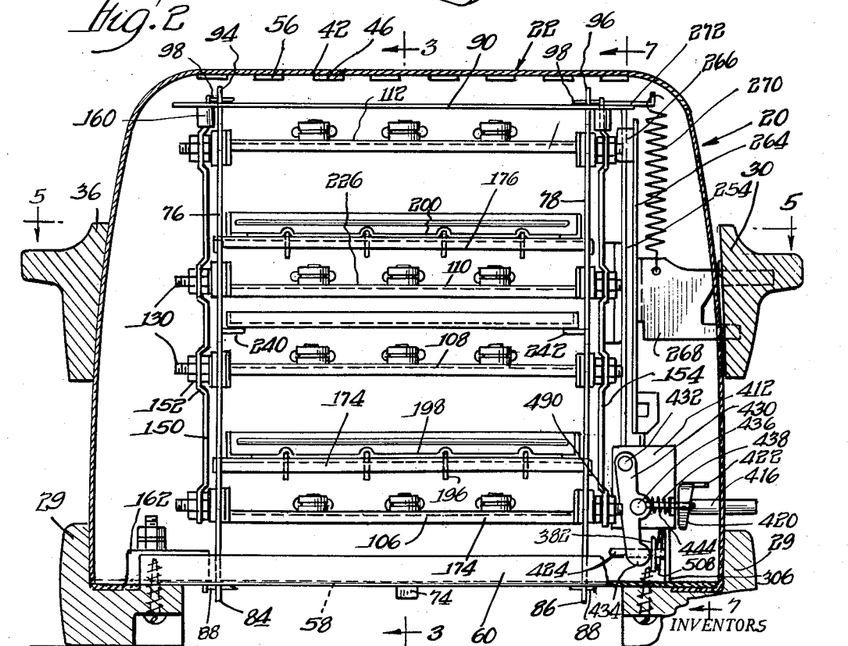
Fig. 2 is a vertical sectional view through the toaster; as taken along the line 2—2 in Fig. 3.

An insulating block which also may be made of ceramic, is identified by the numeral 162 and may be seen in Figs. 2 and 5. This block is provided with a central aperture 164 aligned with a similar aperture in the base plate 58, and is held to the base plate by means such as bolts and nuts 166. Preferably a neck on the bottom of the ceramic block projects through the aperture in the base plate, although this is not illustrated. The two lead wires 170 of the usual flexible line wire (not shown) having a plug on the end thereof extend up through the hole or opening 164 in the insulating block 162 and are provided with eyelets secured beneath nuts on connecting screws 172. These connecting screws are supported solely from the insulating block and are insulated from the base. It will be understood that a knot of approved configuration is made in the wires above the block, or some other type of strain relief device is provided to prevent any strain from being imposed on the wires where they are connected to the eyelets in the event that the line wire should be pulled on.

A pair of bread supports is provided, each being positioned between a pair of the heating units. Specifically, the bread support 174 is positioned above the heating unit 106 and below the heating unit 108, while the bread support 176 is positioned above the heating unit 110 and below the heating unit 112. The bread supporting units are similar, and the unit 176 is shown in detail in Fig. 6. This unit comprises a channel 178 oriented with its open side down, thus being generally similar to the channels 114 and 116, and similarly being held by means of tongues 180 extending from the ends of the channel and projecting through corresponding slots 182 in the end plates 76 and 78. The channel 176 differs from the channels 114 in that the channels 114 are all alike and are punched with small holes for mounting the insulators 138, while the channels 178 are provided with rectangular openings 184. The bread supporting units further include channels 186 extending between the end plates near the back thereof.

These channels are mounted with their webs in a vertical plane, and these channels are provided with tongues 188 which project through co-operating slots 190 (Fig. 4) in the end plates 76 and 78 for mounting these channels. A plurality of wires, four in number in this illustrative embodiment, extends between the front and rear channels 178 and 186 as is illustrated at 192. Conveniently these wires may be held in place by being formed with buttons 194 on the rear ends thereof where they pass through the web of the cannel 186, and being formed with downturned forward ends 196 passing through small openings in the forward channels 178.

A toast or bread carrier 198 is associated with the toast or bread supporting unit 174, while a similar toast carrier 200 is associated with the bread support 176. The toast or bread carriers are similar, and the carrier 200 is shown in detail in Fig. 6. The toast carrier 200 comprises a frame having a back bar 202 which is provided with a longitudinal ridge 204 for reinforcing, and further having end bars 206 and 208. The end bars are provided with horizontal flanges 210 and 212, and these flanges overlap a horizontal flange 214 on the back bar as at 216, and the overlapped flanges may be welded together for rigidity. The carriers further include a plurality of wires arranged transversely of the supporting wires 192. The carrier wires, two of which are identified by the numeral 218, are disposed between the ends of the end bars 206 and 208, and are welded to the horizontal flanges thereof. A third carrier wire 220 is provided with right angularly disposed end portions 222 welded to the flanges 210 and 212, and by virtue of the end portions 222, the carrier wire 220 projects forwardly of the end bars 206 and 208. All of the carrier wires 218 and 220 are provided with crimped portions 224 overlying and aligned with the support wires 192 so that the carrier wires readily slide over the support wires 192, and further to support the slices of bread being toasted more or less at spaced points to avoid unnecessary shadowing of the bread as it is being toasted.

A crumb tray 226 (Fig. 3) is provided for the toaster and extends horizontally through the slots 50 and 104 in the rear face and the back plate of the toaster. The crumb tray comprises a flat bed 228 having a peripheral upturned flange 230, the rear of the flange being higher than the remainder thereof, as is indicated at 232. A thermal insulating knob 234 is mounted on the rear portion of the flange 230, and a spring latch 236 having a struck-up nub 238 thereon is mounted on the bed 228 adjacent the back thereof for coaction with the edge of the rear face adjacent the opening 50. It will be noted that the crumb tray extends substantially from one end plate 76 to the other end plate 78 (Fig. 2), being supported on flanges 240 and 242 struck out from the end plates, and that the crumb tray also extends substantially to the front face of the toaster all of the way from the rear face. This large extent of the crumb tray is of extreme importance, in that it substantially isolates the top and the bottom of the toaster from one another. Thus, there is no stack action causing heat to rise toward the top of the toaster where it tends to toast too much. Particularly the edges of the top sandwich or the like being toasted would be burned in the absence of this crumb tray if the remainder of the top sandwich, and also the bottom sandwich, were properly toasted. Incidentally, this large extent of the crumb tray insures quite effectively against any crumbs dropping from the top sandwich down to the lower pair of heating elements.

Horizontal slots 244 (Figs. 4 and 7) are provided in the end plate 78 in alignment with the toast or bread carriers 200. A rectangular actuating plate 246 (Figs. 5-9) is mounted on the opposite side of the end plate 78 from the carriers 198 and 200, and screws are passed through this actuating plate and are threaded into the ends of the carriers. These screws, identified by the numeral 248, are provided with reduced inner ends having threads thereon so that they may be screwed tightly to the carriers without clamping the actuating plate 246 against the end plate 78. The actuating plate 246 is provided near its top and bottom edges with horizontally disposed stamped ridges 250 whereby the plate may slide horizontally across the end plate 78 with a minimum of friction.

A diagonally disposed channel 252 is provided on the outer face of the actuating plate 246 for shifting the actuating plate horizontally in response to vertical motion.

A vertical guide 254 in the form of a flat sheet metal strap extends between the base plate 58 and the top plate 90, being spaced outwardly a short distance from the end plate 78. The guide 254 is secured in this position by means of a screw 256 passing through the base plate and threaded into a right angularly disposed flange 258 at the bottom of the guide, and by a screw 260 extending through the top plate 90 and threaded into a right angularly disposed flange 262 at the top of the guide. These screws may be self-tapping screws to simplify assembly. An operating plate 264 is spaced outwardly of the guide 254 and is mounted for vertical reciprocation thereon by means of two pairs of vertically spaced apart rollers 266. The two rollers of each pair are spaced apart a sufficient distance for the edges of the guide to be received in peripheral grooves in the rollers. A handle mounting arm 268 is riveted or otherwise suitably secured to the operating plate 264 and projects outwardly therefrom through a slot 269 in the end of the toaster casing for mounting the handle 30. A spring 270 is stretched between the top of the handle mounting arm 268 and a spring anchor 272 held on top of the top plate 70 by means of a screw 260. Thus, the handle mounting arm 268 and the operating plate 264 are constantly urged upwards.

A roller 274 is carried by a stud projecting inwardly from the operating plate 264 and rollingly fits within the diagonally disposed channel 252 on the actuating plate 246. Thus, when the handle 30 is manually depressed to lower the operating plate 264, the roller 274 moves downwardly in the channel 252. The roller cannot move horizontally due to its being mounted on the operating plate 264 which is mounted for vertical reciprocation only. Thus, the roller 274 cams the channel 252 rearwardly of the toaster, thereby moving the actuating plate 246 rearwardly, and hence moving the bread carriers 198 and 200 rearwardly to carry a sandwich or the like to be toasted into toasting position. A latch to be described later is provided for holding the operating plate in lowered position through a predetermined toasting cycle. When the latch is released the spring 270 acts to return the operating plate to its raised position. This causes the roller 274 to cam the channel 252 toward the front of the toaster, thereby returning the actuating plate and the toast carriers to their initial positions in which sandwiches readily may be removed from the toaster.

It will be apparent that the return movement of the parts, if effected too rapidly, would result in catapulting of the sandwiches or the like out of the toaster. Accordingly, we have provided a dash-pot mechanism 276 to avoid this undesirable possibility. The dash-pot mechanism, best seen in Figs. 5, 7 and 8, comprises a cylinder 278 mounted on the end plate 78 by means of an angled bracket 280. A piston 282 is reciprocably mounted in the cylinder 278 and a piston rod 284 is affixed to the end of the piston, conveniently being secured thereto by means of a screw passed through a right angularly disposed eyelet on the end of the piston rod. The left end of the piston rod is connected to the actuating plate 246 by any suitable means such as by curling the end of the piston rod about a sleeve 286 (Fig. 5) mounted beneath the head of one of the screws 248 connecting the actuating plate to the bread or toast carriers. Thus, the dash-pot mechanism precludes return of the actuating plate and toast carriers to their forward positions at a too rapid rate of speed that would result in catapulting of the toasted sandwich or the like from the toaster.

A bracket 288 is affixed to the base plate 58 near the outer end thereof by suitable means such as screws 290 passing through the base plate and threaded into the bracket. The bracket and base plate are provided with aligned openings 292 for ventilation of a thermostatic timing mechanism shortly to be described. The bracket is provided with a right angularly disposed upstanding flange 294, and a latch 296 is pivotally mounted thereon at 298. The latch comprises a hook-like portion 300 engageable in an aperture 301 in a forwardly projecting flange on the operating plate 264. The latch 296 further includes a long arm 302, and a spring 304 is stretched between the hook-like portion 300 and a member mounted on an upstanding arm 306 of the bracket 288 as hereinafter will be set forth in greater detail. Thus, the spring 304 constantly tends to pull the hook portion away from the opening 301 to release the operating plate. However, when the forwardly projecting portion defining the opening 301 abuts the long arm to pivot it from the solid line position to the dotted line position shown in Fig. 13, the hook will engage in the aperture 302 to hold the operating plate down as long as the arm 302 is held down.

The bracket 288 is provided with an upstanding wall 308 at one end thereof, this wall being at the end of the bracket and abutting the end wall 78 and forming a right angle therewith. The wall 308 is provided with a vertical slot 310 in which the arm 302 is movable.

A catch mechanism 312 is mounted on the wall 308 on opposite sides of the slot 310. This mechanism best may be seen in Figs. 11, 12, and 13, and comprises a pair of generally similar arms 314 and 316 pivoted on the wall 308 at 318 and 320. The pivot 318 is located slightly above the pivot 320, the latter being substantially at the same level as the top of the slot 310. The arms confront one another in substantially mirror image relation. The arm 314 includes an actuating toe 322 at its lower end, a tooth 324 intermediate its end and having a cam edge 326. The bottom edge of the tooth is square, and a notch 328 preferably is provided below the tooth. At the top end of the arm there is provided a detent or projection 328, and there is a spaced projection 330 above this detent. The arm 316 is of similar construction, having an actuating toe 332, a tooth 334 having a cam edge 336, and a detent 338 with a second detent 340 spaced thereabove. A spring 342 is compressed between the upper ends of the two arms, the spring encircling the detents 328 and 338, the second detents 330 and 340 helping to anchor the spring on the aforementioned detents.

A channel-like supporting box 344 having a web 346 and a pair of side flanges 348 and 350 is secured in vertical position against the outer face of the wall 308 by means such as rivets 352 passed through a lateral flange 353 on the flange 348 and also through the wall 308. A substantially Z-shaped bracket 355 is secured to the inner face of the web 346 by means such as a screw or rivet 357, and the upper portion of the bracket 350 is provided with an opening 354 coaxial with a relatively small opening 356 in the web. A release member 358 is mounted in these openings and comprises a rod 360 having an enlarged cylindrical portion 362 thereon provided with a frusto-conical front portion 364 which is terminated by an axially projecting pin 366. A coil spring 368 encircling the rod 360 normally urges the release 358 in a retracted position (to the right as shown in Figs. 7, 8, 11 and 13).

A rotatable or pivotable shaft 370 is journaled in suitable apertures in the flanges 348 and 350 and projects outwardly through the end of the toaster casing and has the knob 34 suitably fixed thereon. This shaft carries a small plate 372 which is secured to the shaft by means such as a screw 374, an access hole 376 being provided in the web 346 to allow threading into place of the screw.

The plate is provided with an aperture which receives the rod 360 sufficiently loosely to allow pivoting of the shaft 370, but this aperture is sufficiently small to prevent the enlarged cylindrical portion 362 from moving back through the aperture. When shaft 370 is rotated in a clockwise direction (Fig. 13), the release 358 is moved to the left to move the arms 314 and 316 as hereinafter will be brought out with considerable particularity. Release of the knob 34 used in turning the shaft 370 allows the parts to return to their normal positions under the influence of the spring 368.

An angle bracket 378 is riveted or otherwise suitably secured to the upstanding flange 294 of the bracket 288, and the outwardly projecting flange 380 of this bracket is provided with a slot in which there is pivoted a bimetal strip 382. This bi-metal strip has heating elements 384 wound thereon, mica or some other suitable insulating material which will not be damaged by high temperatures is interposed between the heating elements 384 and the bi-metal strip 382. One end 386 of the strip projects through a rectangular opening 388 in the web 346 of the box 344 and is positioned for engaging either of the toes 322, 332, of the catch arms 314 and 316. The mounting of the opposite end will be described shortly.

Figure 10:
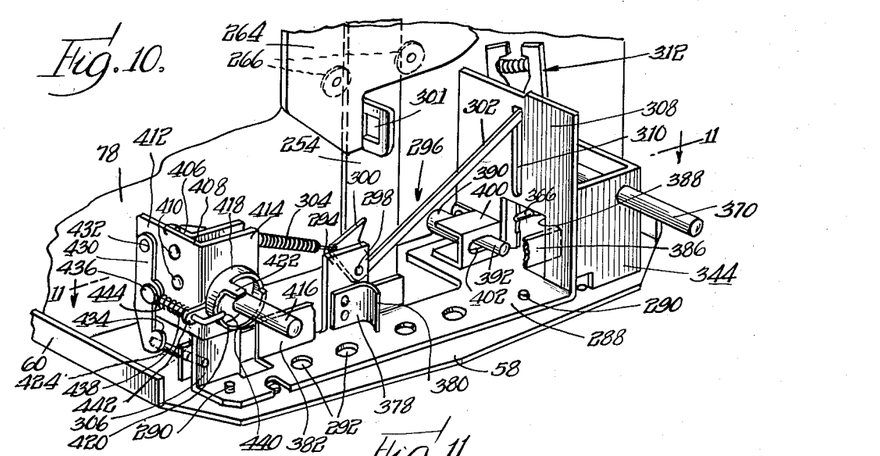
Fig. 10 is a fragmentary perspective view showing the thermostatic control mechanism of the toaster.
Figures 11, 12, 13:
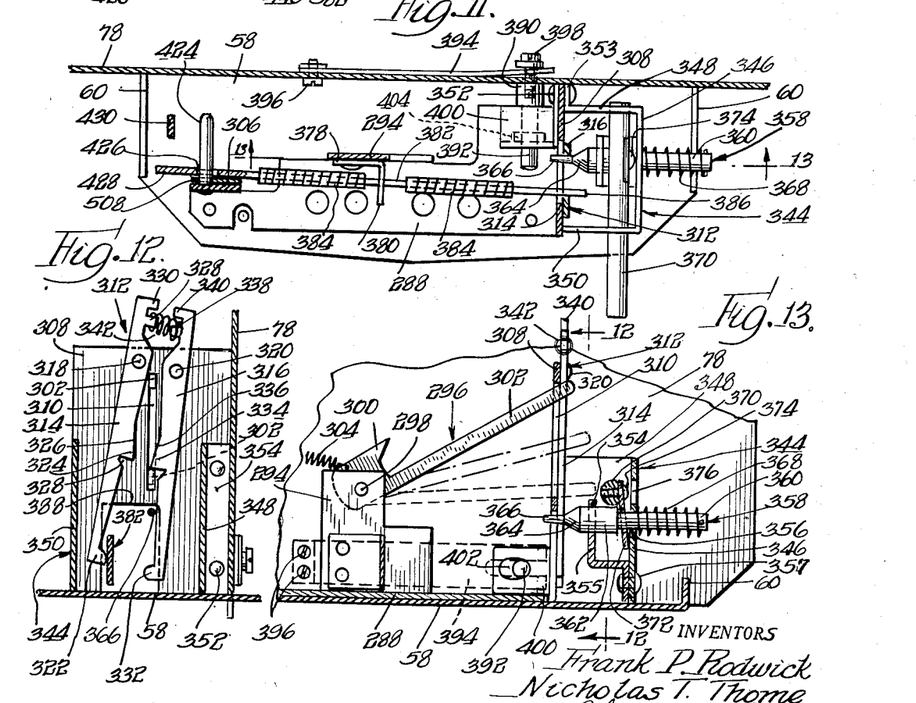
Fig. 11 is a horizontal view of the thermostatic mechanism as taken substantially along the line 11—11 in Fig. 10.
Fig. 12 is a detail end view of the thermostatic mechanism as taken substantially along the line 12—12 in Fig. 13.
Fig. 13 is a side view of the thermostatic mechanism partly in section as taken along the line 13—13 in Fig. 11.
Figure 14:
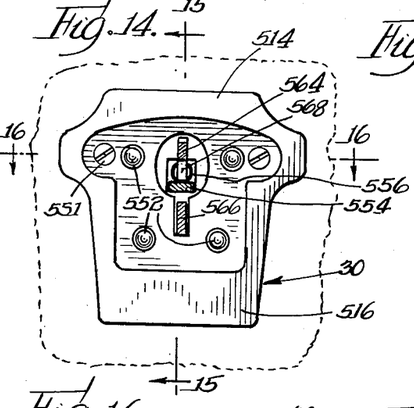
Fig. 14 is a transverse view taken through the attaching means of the handle generally along the line 14—14 of Fig. 15.

A cylindrical sleeve 390 is welded or otherwise secured to the end plate 78, as may be seen in Figs. 10 and 11. An aperture (not shown) is provided in the end wall 78 in alignment with the bore of the sleeve, a plunger 392 is mounted therein for axial movement, a leaf spring in the form of a bi-metal strip 394 (see also Figs. 9 and 13) on the inner side of the end wall 78 bears against the plunger to urge it outwardly away from the end wall 78. The leaf spring bi-metal strip forms an auxiliary compensator as hereinafter will be pointed out and is secured to the end plate by means such as screws 396 passing through the end plate and threaded into the end of the leaf spring. A screw 398 passes loosely through an opening adjacent the opposite end of the leaf spring and is threaded into the rear end of the rod or plunger 392 to prevent the plunger from passing outwardly from the cylinder 390. A box-like bracket 400 is secured to the wall 308 by means such as one of the rivets 352 passing through a flange thereon. The web of the bracket 400 is provided with an elongated opening 402 through which the plunger 392 passes, and a square element 404 on the plunger 392 slides in the bracket 400 between the flanges thereof accurately to guide the plunger 392.

Reference previously has been made to the upstanding arm 306 adjacent the end of the bracket 288. This arm is provided adjacent its top portion with a right angularly disposed flange 406 along one edge, and an angle bracket 408 is secured to this flange by means such as rivets 410. The spring 304 previously mentioned is secured at one end to the top edge of one flange 412 of the angle bracket 408, preferably by means of a small hole near the upper edge receiving the hooked end of the spring. The other flange 414 of the angle bracket 408 is spaced outwardly a short distance from the arm 306. A shaft 416 is rotatably carried from the flange 414 of the angle bracket 408, and a cam 418 having a generally helical cam edge 420 is fixed on this shaft. Stops 422 are provided projecting outwardly beyond the helical cam edge 420 for limiting movement relative to a cam follower to be described shortly hereinafter. The shaft 416 extends outwardly of the toaster as readily may be seen in Fig. 2, and the knob 32 is suitably fixed on the end of this shaft.

A pin 424 projects from the upstanding arm 306 toward the end plate 78. An opening 426 in the bi-metal strip 382 near the end thereof fits over this pin to insure movement of the end of the bi-metal in a proper direction. A limit stop is provided for this end 428 of the bi-metal, and the limit stop comprises an arm 430 pivoted at its upper end at 432 on the flange 412 of the angle bracket 408. This arm is provided at its lower end with a toe 434 positioned for engagement with the end 428 of the bi-metal strip 382. A pivotal connection 436 is made intermediate the ends of the arm 430 to an L-shaped cam follower 438 having the right angularly disposed end 440 thereof riding on the helical cam edge 420 of the cam 418. The cam follower 438 passes through an opening in an ear 442 struck out from the flange 412, and a spring 444 is compressed between this ear and the arm 430 to hold the tip 440 against the cam edge 420.

Figure 18:
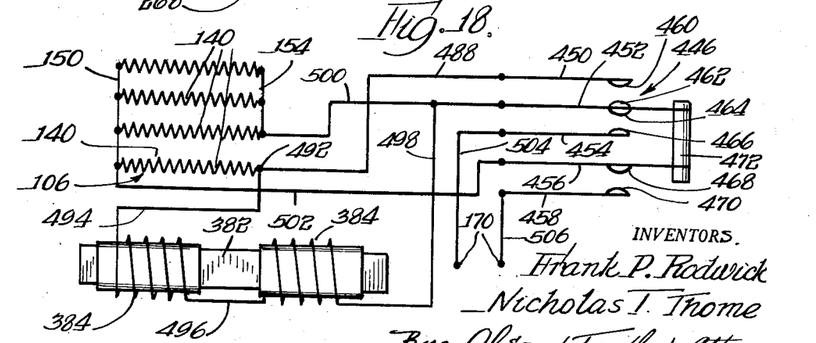
Fig. 18 is a wiring diagram of the toaster.

From the foregoing it will be apparent that the rotational position of the knob 32 and shaft 416 determines the portion of the cam edge 420 that will engage the cam follower tip 440. This in turn determines the position of the arm 430, and particularly of the toe thereof. Inasmuch as this toe forms a limit stop for the end of the bi-metal strip 382, its position determines the toasting time as controlled by the bi-metal strip. The manner in which the latching parts and the bi-metal coact to time a toasting operation will be described shortly hereinafter following a description of the electrical circuit. The wires in general have been omitted from the drawing for clarity of illustration, but the switches 446 are shown physically in Figs. 7 and 8, while the remainder of the electrical circuit, including the switch mechanism 446, is shown schematically in Fig. 18. Reference therefore should be had at this time to these three figures.

The switch structure or mechanism 446 includes a suitable bracket 448 insulatedly and individually supporting a plurality of switch arms from the end plate 78. These switch arms, numbered 450, 452, 454, 456 and 458 from top to bottom are provided adjacent their outer ends with contact buttons. The top switch arm 450 is provided on the bottom of its outer end with a switch contact or button 460. The second switch arm 452 is provided on its top surface with a switch contact or button 462 engageable with the contact 460, and a contact 464 is provided on the second switch arm directly below the contact 462. This contact is engageable with a contact 466 on the top of the outer end of the third switch arm 454. The switch arms 456 and 458 respectively carry contacts or buttons 468 and 470 which are positioned for engagement with one another. An insulating cylinder or post 472 of ceramic or the like is carried by the ends of the second and fourth switch arms 452 and 456 respectively, these ends extending beyond the ends of the other three switch arms.

The operating plate 264 is provided with a right angularly disposed flange 474 which carries a set screw 476 forming an adjustable stop engageable with the ceramic cylinder 472. A locking nut 478 is provided on the set screw 476 for locking the same in place.

A flange 480 also is provided on the operating plate 464 and this flange is positioned below the switch arms. A stop 482 carried by this flange is urged upwardly by a spring 484 encircling the stop and compressed beneath the enlarged head thereof. The limit to which the stop 482 can be raised by the spring 484 is adjustable determined by a nut 486 threaded on the lower end of the stop. This stop is positioned to engage the lower end of the ceramic insulator 472 when the operating plate is raised.

The switch arm 450 is connected by means of a wire 488 to one end of the heating element 140 associated with the lowest heating unit 106. In this connection it will be noted in Fig. 2 that the connector at the end of the lowermost heating elements is insulated from the busbar 154 by suitable insulation which may include mica spacers or washers 490. The connection is indicated schematically at 492 in Fig. 18. The connection 492 also is connected by means of a wire 494 to one end of one of the bi-metal heating elements 384. The other end of this bi-metal heating element is connected by a wire 496 to the other heating element 384, and this in turn is connected by means of a wire 498 to the switch arm 452.

The switch arm 452 further is connected by means of a wire 500 to the busbar 154 connected to the remaining heating elements 140. The busbar 150 on the other side of the heating elements including the lowest heating element is connected by means of a wire 502 to the fourth switch arm 456.

The switch arm 454 is connected by a wire 504, and the switch arm 458 is connected by a wire 506 to the line wires 170 previously mentioned.

Before proceeding with the operational switching sequence, and the accompanying movement of parts attendant upon an operating cycle of the toaster, it should be brought to attention that the ambient temperature of the toaster will affect the timing of a toasting cycle when a thermal timer is used. The ambient temperature of the toaster will depend upon whether a piece of toast has been toasted lately, or whether the toaster has been out of operation for some time. When the toaster has been in operation the ambient temperature also will depend upon various factors including line voltage, room temperature, and the position of the toaster relative to an open window or the like. These and other factors tend to cause improperly done toast to be produced by many conventional toasters. In order to avoid inconsistencies in toasting dependent upon these and other factors, I have introduced compensators into the thermal timing mechanism. These compensators include the plunger 392 and spring strip 394 previously mentioned. The spring strip 394 is a bi-metal strip and assumes the positon shown in Fig. 11 when the toaster is cold. Accordingly, the plunger 392 imposes a load upon the end 386 of the bi-metal strip 382 when the same is deformed by heat as hereinafter will be described. It will be appreciated that the first part of the heating cycle is relatively ineffective when the toaster is starting out cold, and that the load imposed by the plunger on the bi-metal strip 382 compensates for this. Once the interior of the toaster has come up to its normal operating temperature, the bi-metal strip 394 retracts the plunger 392 until the square element 404 on the plunger engages the cylinder 390 to limit retraction of the plunger.

The strip 394 acts to lengthen the toasting cycle only when the toaster is started up cold. Accordingly, it may be termed an auxiliary compensator. The main compensator which acts to shorten the toasting cycle upon further heating and a rise in the ambient temperature of the toaster is found supported from the arm 306. This compensator comprises a bi-metal strip 508 (Figs. 2, 5 and 11). This strip has its upper end secured substantially at the upper end of the arm 306 by means such as rivets 510, and the lower end of the strip is positioned to abut the end 428 of the main bi-metal strip 382. Before the toaster has heated up, the strip 508 lies flat against the arm 306, but upon a rise in temperature of the toaster, this strip moves away from the arm, and thereby acts as a stop limiting movement of the bi-metal strip to shorten the time of a heating cycle as hereinafter will be set forth.

To initiate a toasting cycle, assuming the line wire of the toaster is properly plugged in, it is necessary only to depress the handle 30. This moves the operating plate 264 from the normal raised position shown in Fig. 7 to the depressed position shown in Fig. 8, thus camming the actuating plate 246 from the front toward the rear of the toaster as shown in the same two figures, to move the toast carriers 198 and 200 back into the toaster to carry the sandwiches or the like into toasting position. When the operating plate 264 is lowered to the position shown in Fig. 8 it abuts the arm 306 of the latch 296, thereby pivoting it against the force of the spring 304 to engage the hook portion 310 in the aperture 302 (Fig. 10) to hold the operating plate 264 in lowered position against the force of the spring 270.

The operating plate 264 upon approaching its lowermost position brings the stop 476 into engagement with the ceramic button on the switch arms 452 and 456. Thus, when the operating plate is in its fully lowered position, the switch contacts 464 and 466 are in engagement, and the switch contacts 468 and 470 are in engagement. This completes a circuit from the line 170 through the wire 504, the switch contacts 466 and 464 and through the wire 500 to the heating elements 140 of the top three heating units. The other sides of the heating units are connected through the busbar 150 and the wire 502 and through the contacts 468 and 470 to the other side 506 of the line 170. The lowermost heating element and the thermostat coils also are connected in circuit at the same time. The wire 504 is connected through the switch contacts 466 and 464 as previously noted, and the latter contact is connected through the switch arm 452 to the wire 498 leading to the heating coils 384 of the bi-metal strip 382, and the wire 494 connects this to the lowermost heating element which is connected to the same busbar 150 as the remaining heating elements.

Thus, the heating coils 384 of the bi-metal strip 382 are connected in series with the lowermost heating element, and this series combination is connected in parallel with the top three heating elements, these top three heating elements being connected in parallel with one another. The heating or toasting elements 140 thus are energized to toast or grill a sandwich or the like in the toaster.

Reference now should be had to Fig. 12 wherein it will be seen that the arm 316 is held against the pin 366 projecting from the release 358, while the arm 314 is held against the spring action by the bi-metal strip 382. The bi-metal strip cannot pivot because of the abutment of the opposite end thereof against the compensator bi-metal strip 508. The arm 302 of the latch 296 engages beneath the tooth 334 as may be seen in Figs. 12 and 13 in dashed lines to hold the arm in lowered position, and hence to latch the operating plate in lowered position. As the bi-metal strip 382 is heated by the heating coils 384 it is bowed into a convex-concave shape with the convex side being toward the end plate 78. Hence the end 428 comes into engagement with the toe 434 of the arm 430, and the opposite end 386 of the bi-metal moves toward the toe 332 of the arm 316. As this opposite end 386 moves, it allows the arm 314 to move toward the arm 316. After a predetermined time interval determined by the setting of the knob 32 and cam 418 the strip engages the toe 434 of the arm 430, and this end of the strip no longer can move upon further heating. Accordingly, the end 386 of the strip pushes against the toe 332, the strip being retarded by the plunger 392 and auxiliary compensating bi-metal strip 394 during an initial toasting cycle. The bi-metal pushes on the toe 332 with sufficient force to pivot the arm 316, whereby to move the tooth 334 from above the arm 302. The tooth 324 by this time has moved into position above the arm 302, but spaced a slight distance above the tooth 334 due to the different horizontal elevations of the pivots 318 and 320. Accordingly, the arm 302 is allowed to rise slightly under the action of the spring 304, and the hook portion 300 is partially retracted from the aperture 302. Thus, the operating plate 264 is allowed to rise a slight distance.

Such slight rising of the operating plate causes the stop 476 to move upwardly a corresponding distance, thereby allowing the ceramic cylinder 472 to rise slightly. As a result, the switch contact 462 moves into engagement with the contact 460, the previously noted engaging contacts remaining in engagement. This causes the heating coils 384 of the bi-metal strip 382 to be shorted out through the contacts 460 and 462, the switch arms 450, 452, the wires 488, 494, and 498. The lowermost heating element 140 simultaneously is brought into parallel connection with the uppermost heating elements through the engagement of the contacts 460, 462 and the switch arms 450, 452, and the wires 488 and 500. Thus, the toasting elements remain energized to continue the toasting or grilling of a sandwich or the like, while the bi-metal 382 begins to cool off. As the bi-metal cools off, it straightens out. After it has straightened out to a certain degree, the end 428 thereof will engage the compensating bi-metal 508. The position of the compensating bi-metal depends upon the temperature of the toaster, and it will be flat against the arm 306 when the toaster is relatively cool, and will move progressively farther away from this arm with increasing toaster temperatures. When the end of the bi-metal 382 can move no farther, due to engagement with the compensating bi-metal strip 508, then the opposite end 386 of the bi-metal strip presses against the toe 322 of the arm 314 with sufficient force to retract the tooth 328 from above the arm 302. The arm then is free to pivot to the solid line position shown in Figs. 12 and 13 under the influence of its biasing spring 304, and the operating plate 264 is released.

Figure 7:
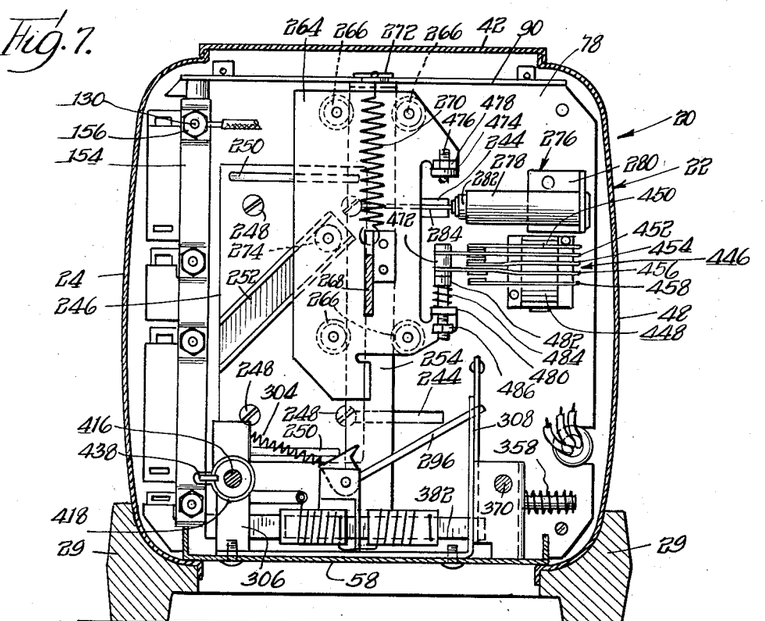
Fig. 7 is a vertical cross sectional view of the toaster taken substantially along the line 7—7 of Fig. 2.
Figure 8:
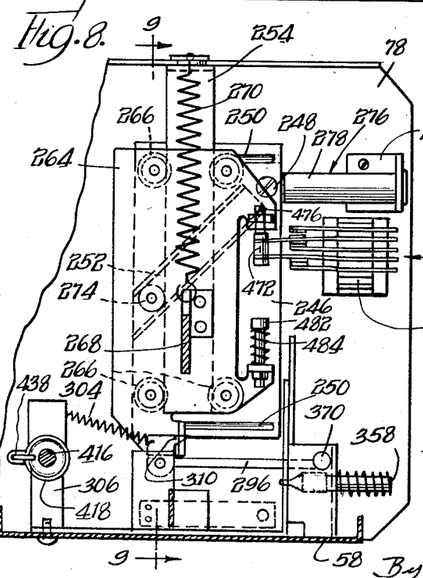
Fig. 8 is a fragmentary view similar to a portion of Fig. 7, with the parts in a different position of operation.
Figure 9:
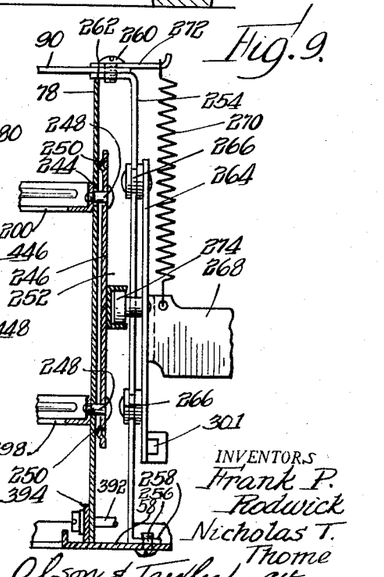
Fig. 9 is a vertical sectional view taken substantially along the line 9—9 in Fig. 8.

The released operating plate rises rapidly under the influence of the spring 270, and the roller 274 acts on the channel 252 to cam the actuating plate 246 forwardly to its initial position as shown in Fig. 7, the speed of return movement being limited by the dash-pot mechanism 276 to prevent catapulting of the toasted or grilled sandwiches or the like from the toaster. As the operating plate approaches its fully raised position, the stop 482 engages the ceramic cylinder 472 and raises the same to move the contacts 464 and 468 respectively out of engagement with the contacts 466 and 470 completely to isolate the heating elements from the line. Thus, there is no potential on the heating elements regardless of which way the line plug is plugged in, and it is impossible for an operator to receive an accidental shock. It will be observed that the spring 484 will allow retraction of the stop 482 to prevent bearing against the ceramic cylinder 472 with sufficient force to cause damage to the switch mechanism.

It has been noted heretofore that the vertically operating handle 30 for producing horizontal movement of the bread or toast carrier is more convenient and is much safer than would be a horizontally operating handle which would tend to push the toaster or grill from the table or other support. Some previous vertical operating handles for conventional vertical toasters have tended to tip the toasters in a vertical plane. This has been true because with reasonable manufacturing tolerances the handles may in some instances project out beyond the toaster casing a substantial distance, thereby forming an unnecessarily long lever arm. Furthermore, the appearance of a toaster or the like is spoiled somewhat when an operating arm projects too great a distance. In order to overcome these difficulties, applicant has provided a novel supporting and connecting structure for the handle 30 as hereinafter will be described.

The handle 30 which previously has been referred to, preferably is molded of plastic or any other suitable heat insulating material. Handle 30 comprises an outwardly projecting finger piece 512, an upwardly extending portion 514, and a downwardly extending flange 516. The outline of the handle is more or less rectangular and projects laterally outwardly in the vicinity of the finger piece 512. The face of the handle projecting toward the toaster casing is recessed at 518 in a more or less horizontal shape with ears 520 projecting horizontally from the top corners thereof. Screw holes 522 are provided in the handle behind the ears 520. These holes may be left unthreaded so that when screws are threaded thereinto, they will form threads in the plastic material of the handle, or threads may be formed in the material of the handle or metallic threaded inserts may be placed in the holes, depending on the material of which the handle is made.

Centrally of the handle and near the top thereof there is provided a narrow and deep recess 524. Immediately beneath the recess 524 and opening thereinto is a wider recess 526 of somewhat shallower depth, being terminated at 528. A guide or locating plate 530 is provided which is complementary in configuration to the recess 518. The guide plate 530 is provided with holes 532 aligned with the screw holes 522 and also is provided with four ball locating holes 534 in generally rectangular array. The guide plate 530 also is provided with a narrow slot 536 which is aligned with a relatively shallow narrow recess 538 in the handle, and with an inverted T-shaped recess 540 alignable with the recesses 524 and 526.

Figure 15:
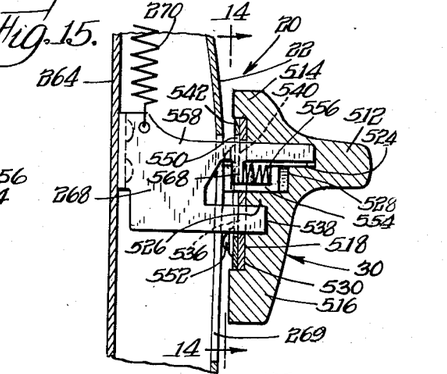
Fig. 15 is a longitudinal sectional view through the handle taken substantially along the line 15—15 in Fig. 14.
Figures 16, 17:
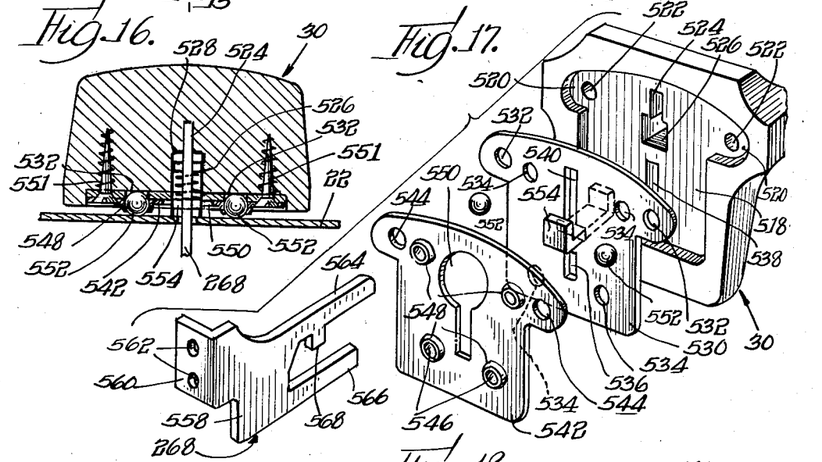
Fig. 16 is a fragmentary horizontal sectional view taken along the line 16—16 in Fig. 14.
Fig. 17 is an exploded perspective view of the parts of the handle.

There is also provided a retainer plate 542 which is similar in outline to the guide plate 530. This plate also is provided with screw holes 544 which are aligned with the screw holes 532 and 522. The retainer plate 542 also is provided with openings 546 aligned with the ball locating openings 534, and punched out frusto-conical bosses 548 surround these holes and form ball-retaining sockets. The retainer plate 542 also is provided with a generally keyhole shaped slot 550, which aligns both with the narrow slot 536 and the inverted T-shaped slot 540 of the guide plate 530. The guide plate 530 is positioned in the recess 518, and the retainer plate 542 also is positioned in the recess abutting the retainer plate, being held in place by screws 551, and with four balls 552 trapped in the ball retainers 548 and in the ball locating or positioning holes 534. The balls extend forwardly beyond the ball retainers as readily may be seen in Figs. 15 and 16 for engagement with the central portion 42 of the toaster housing as will be brought out hereinafter. In addition to the foregoing parts, the handle includes a latch member 554 of generally U-shaped construction, having rather short legs and a wide bight. This latch is located in the T-portion of the slot 540 and a coil spring 556 is compressed between the locator plate 530 and the inner leg to urge the latch into the recess 526 of the handle.

Reference heretofore has been made to the handle mounting arm 268. This arm comprises a generally flat body portion 558 having a right angularly disposed flange 560 thereon which is provided with a pair of apertures 562 through which rivets or the like are passed to hold the handle mounting arm 268 on the operating plate 264. A long finger 564 and a short finger 566 project from the body portion 558 and are co-planar therewith. A detent 568 depends from the finger 564 near the base thereof. In assembling the handle on the handle mounting arm, the handle is slipped over the fingers 564 and 566, these fingers respectively fitting through the keyhole slot 550, the slots 540 and 536, and into the recesses 524 and 538. The handle is tilted up slightly in starting the assembling, so that the outwardly projecting leg of the U-shaped latch 554 may be passed under the finger 568, the latch being pulled out against the force of the spring 556 for this purpose. Straightening up of the handle then causes the spring to push the latch 554 into the handle a sufficient distance for the balls 552 to abut the central section 42 of the toasting casing 20, the leg of the latch pulling on the detent 568 for this purpose. Thus, regardless of any variations in dimensions such as may be encountered in mass production the handle will be held snugly up against the end of the toaster housing or case. This results in a more stable structure, and one which is more attractive in appearance. The balls form a ball bearing slide between the handle and the toaster housing so that no substantial friction is caused by engagement of the handle parts with the toaster housing.

It now should be apparent from the foregoing description that we have invented a novel toaster or grill for toasting sandwiches or the like in horizontal position. The bread or toast carriers are of superior construction, and are moved horizontally through the intermediary of a superior actuating mechanism by vertical movement of an operating handle. The vertical movement of the operating handle precludes any tendency to push the toaster or grill off the table or other supporting surface, and the handle hugs the toaster casing snugly to minimize any tendency toward tipping of the toaster, while at the same time providing a pleasing appearance. An improved thermostatic mechanism insures proper timing of a toasting operation regardless of whether the toaster is started cold or following a previous toaster operation, and regardless of the operating temperature that may be reached by the toaster. The latch release 358, having the frusto-conical tip 364, readily spreads the latching arms apart at any time during a toasting cycle to allow manual interruption of the toasting cycle. The heat distribution as effected by the large central crumb tray which prevents any stack action, and also as in part determined by the slots at the top edges of the toaster housing insures uniformity of toasting. That is to say, a sandwich or the like is not burned at the edges, the center portion is properly done, and the upper sandwich or the like is not toasted to a greater degree than is the lower sandwich or the like.

It will be understood that the specific structure heretofore shown and described is for illustrative purposes only. Various changes in structure may occur to those skilled in the art and are to be understood as forming a part of our invention, insofar as they fall within the spirit and scope of the appended claims.

We claim:

1. A toaster comprising a housing having an opening in one side thereof, heating means in said housing above and below the opening for toasting a slice of bread or the like, a carrier in the toaster substantially aligned with said opening and mounted for horizontal movement toward and from the said opening, a pair of operator members movable with respect to one another in relatively closely spaced parallel planes between one limit position with the operator members substantially coincident with one another and another limit position with the operator members only partially coincident with one another, one of said operator members being connected directly to said carrier for horizontal movement in unison therewith, vertical guide means within the housing adjacent said operator members, the other of said operator members having upper and lower mounting devices engaging said guide means for mounting the associated operator member on the guide means for substantially vertical rectilinear movement therealong, an inclined cam track fixed to one of said operator members and substantially traversing the same and movable in unison therewith, a cam track follower engaging said cam track and fixed to the other of said operator members and movable in unison therewith along said cam track, said cam track being disposed between the mounting means and within the confines of the operating members when said operator members are in substantially coincident position, and handle means disposed exteriorly of said housing and connected to the vertically movable operator member for shifting the same in at least one direction to cause through said cam track and cam track follower horizontal movement of the other operator member and the carrier connected thereto.

2. A toaster as claimed in claim 1, wherein the cam track is mounted on the horizontally movable operator member with the cam track follower mounted on the vertically movable operator member.

3. A toaster as claimed in claim 1, wherein a spring urges the vertically movable operator member in a direction opposite to that of the handle means.

4. A toaster comprising a housing having a pair of vertically spaced horizontal openings in one side thereof, heating means disposed above and below each of said openings in said housing for toasting a slice of bread or the like, bread supporting and carrying means adjacent each of said openings and disposed between the heating means and mounted for horizontal movement toward and from said openings, means for so operating said bread supporting and carrying means, a supporting grill disposed below said supporting and carrying means and including a transverse channel member disposed adjacent each of said openings, each of said channel members being oriented with the open side down, and each of said channel members being provided with a plurality of openings in the web thereof for promoting proper heat flow in the space adjacent each opening, and a substantially horizontally disposed crumb tray extending into said toaster through a horizontal slot therein and disposed between said openings dividing the toaster into upper and lower chambers, said crumb tray substantially isolating the upper and lower chambers from one another and traversing the space between adjacent channel members to confine heat flow through said channel members to their respective chambers and prevent heat rise through stack action.

References Cited in the file of this patent

UNITED STATES PATENTS

| | | |
|---|---|---|
| Re. 22,781 | Anderson | Aug. 20, 1946 |
| Re. 23,461 | Gussack | Feb. 12, 1952 |
| 1,212,992 | Obrien | Jan. 16, 1917 |
| 1,550,949 | Coleman | Aug. 25, 1925 |
| 2,141,867 | Ireland | Dec. 27, 1938 |
| 2,234,764 | Ireland | Mar. 11, 1941 |
| 2,288,748 | Scharf | July 7, 1942 |
| 2,315,327 | Gomersall | Mar. 30, 1943 |
| 2,344,842 | Weeks | Mar. 21, 1944 |
| 2,378,073 | Felver et al. | June 12, 1945 |
| 2,429,736 | Wales | Oct. 28, 1947 |
| 2,436,735 | Walder et al. | Feb. 24, 1948 |
| 2,500,397 | Bauerlein | Mar. 14, 1950 |
| 2,503,960 | McCullough | Apr. 11, 1950 |
| 2,542,231 | Campbell | Feb. 20, 1951 |
| 2,578,034 | Baltzell | Dec. 11, 1951 |
| 2,696,128 | Runke et al. | Dec. 7, 1954 |
| 2,719,479 | Rodwick | Oct. 4, 1955 |
| 2,812,222 | Gussack | Nov. 5, 1957 |